H. D. CHURCH.
LAMP BRACKET.
APPLICATION FILED SEPT. 7, 1915.
1,259,958.
Patented Mar. 19, 1918.
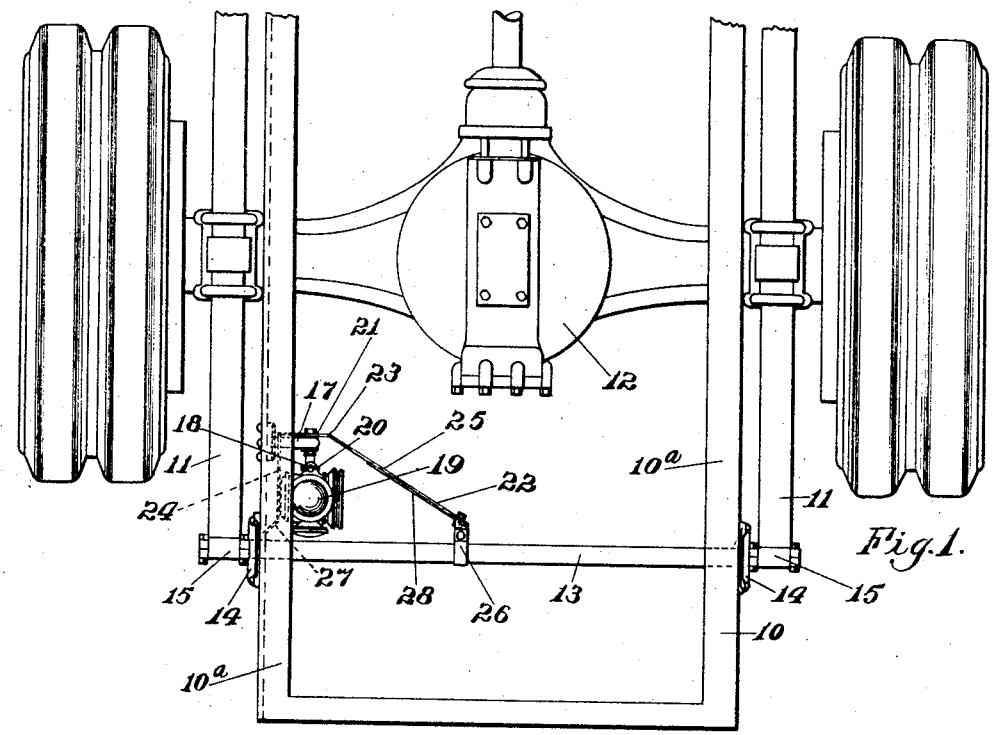
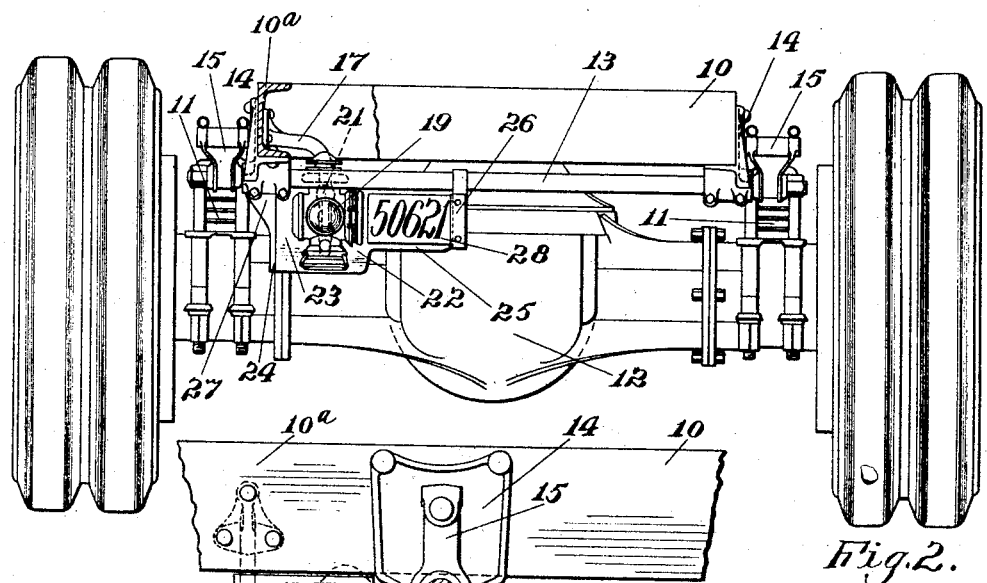
Witness:
Blair J. Cote.
Inventor:
Harold D. Church,
By Milton Tibbetts,
Attorney.

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

LAMP-BRACKET.

1,259,958.     Specification of Letters Patent.     Patented Mar. 19, 1918.

Application filed September 7, 1915. Serial No. 49,261.

*To all whom it may concern:*

Be it known that I, HAROLD D. CHURCH, a citizen of the United States, and resident of Detroit, Wayne county, State of Michigan, have invented certain new and useful Improvements in Lamp-Brackets, of which the following is a specification.

This invention relates to improvements in lamp brackets or the like but more particularly in connection with tail lamps for use on motor vehicles as described in the present specification and illustrated in the accompanying drawings which form part of the same.

The invention consists essentially of the novel arrangement and construction of parts whereby a bracket secured to the frame of a motor vehicle in combination with a spring shackle and a transverse rod is adapted to support a lamp and a shield therefor, to which shield a license plate may be readily attached.

The object of the invention is to provide a bracket of simple and durable construction which will form a suitable and rigid support for a tail lamp in a convenient position at the rear of the vehicle.

Another object of the invention is to insure adequate protection to the lamp from flying fragments of rock and foreign substances while the vehicle is in motion.

A further object of the invention is to provide a means of support for the customary license plate in a desirable and conspicuous location.

Referring to the drawings:

Figure 1 is a plan view of the rear end of the chassis of a commercial motor vehicle showing the invention mounted thereon;

Fig. 2 is a rear elevation of Fig. 1 with a part of the frame broken away; and

Fig. 3 is an enlarged fragmentary view showing the invention in side elevation.

In the drawings, 10 represents the frame of a motor truck having side members $10^a$ supported by springs 11 mounted on the customary worm drive axle 12. A transverse rod 13 is supported beneath the frame by suitable brackets 14 and extends beyond the side members thereof to provide bearings for a pair of spring shackles 15 which support the rear ends of the springs.

17 represents a hanger or bracket of irregular form which is secured to the inner face of one of the frame side members $10^a$. The lower end of the bracket is curved upwardly forming a substantially vertical supporting member 18 for a lamp 19.

The lamp shown is of customary form having a vertical socket member adapted to fit the supporting part 18 of the bracket and is retained securely in position by means of a cotter pin 20.

A pair of bosses 21 are formed on the bracket 17 intermediate of the length thereof, each boss having a transverse orifice therethrough. A shield 22 is secured to the bracket 17 by means of bolts which extend through these transverse orifices and corresponding apertures in the shield thereby supporting the said shield beneath the frame and adjacent to the lamp.

The shield 22 comprises a portion 23 by which it is supported and which protects the bracket side of the lamp, and two side portions 24 and 25 one of which is arranged close to one side of the lamp and the other of which is diagonally arranged at one of the other sides of the lamp and is secured to the transverse rod 13 by a strap or bracket 26. A flange 27 is formed on the portion 24 and is secured to the frame 10 or bracket 14 but preferably to the latter by one of the bolts which secure the rod 13 to the bracket.

A license plate 28 is conveniently arranged on the diagonal portion of the shield by suitable supporting means and the angular position of the portion 25 of the shield permits the rays from the side lens of the lamp to strike full upon the license plate rendering the same discernible at a considerable distance to the rear of the truck.

It will be observed that the peculiar formation of the shield and its close proximity to the lamp afford ample protection to the latter from flying stones and mud thrown up by the wheels of the vehicle.

It will be seen also that the manner of supporting the respective members of the shield insures a rigid construction and obviates all possibilty of rattling.

It will also be apparent that although the preferable form of the invention is shown, many modifications may be made without departing from the scope of the invention and it is not intended to limit the invention to the particular construction depicted and described.

Having thus described my invention, what I claim and desire to secure by Letters Patent is:—

1. In a motor vehicle, the combination with the frame, a transverse rod, a bracket secured to the frame, and a lamp mounted thereon, of a shield secured to the bracket and to the transverse rod.

2. In a motor vehicle, the combination with the frame having a transverse rod mounted thereon and a lamp secured thereto, of a shield secured to the frame and to the transverse rod for protecting the lamp.

3. In a motor vehicle, the combination with the frame, a pair of supports secured to the frame, a transverse rod mounted in said supports, a bracket secured to the frame, and a lamp mounted thereon, of a shield for the lamp secured to the bracket, the transverse rod and one of said supports.

4. In a motor vehicle, the combination with the frame, a transverse rod, a bracket secured to the frame, and a lamp mounted on the bracket, of a shield secured to the bracket, the frame and the transverse rod, and adapted to support a license plate.

In testimony whereof I affix my signature.

HAROLD D. CHURCH.

Copies of this patent may be obtained for five cents each, by addressing the "Commissioner of Patents, Washington, D. C."